Jan. 16, 1968   J. J. SIMKO   3,363,500

SCREW

Filed March 10, 1965

INVENTOR

JOHN J. SIMKO

BY Hoffmann and Yount

ATTORNEY

United States Patent Office 3,363,500
Patented Jan. 16, 1968

3,363,500
SCREW
John J. Simko, Lyndhurst, Ohio, assignor to The National Screw & Manufacturing Company, Cleveland, Ohio, a corporation of Ohio
Filed Mar. 10, 1965, Ser. No. 438,496
1 Claim. (Cl. 85—45)

The present invention relates to threaded fasteners and their driving tools.

In many applications it is desirable to employ a threaded fastener which when driven cannot be removed with commonly available tools such as conventional screwdrivers, and the like, but can be removed only with a unique tool having a conjugated driving connection. Such fasteners are commonly referred to as "tamper-proof" fasteners.

The principal object of this invention is to provide a novel and improved threaded fastener having a driving recess of a configuration such that it cannot be rotated with a conventional screwdrive or wrench.

Another object of this invention is to provide a so-called tamper-proof screw which is simple in design and can be effectively employed in high torque applications, but can be readily manufactured on conventional equipment with comparatively simple tooling.

A more specific object of this invention is to provide a so-called tamper-proof threaded fastener comprising a driving recess in the form of a conical depression having therein three symmetrically oriented similar conical segments each comprising an axially oriented face, the intersection of which face and the end surface of the fastener is a chord of the circle forming the periphery of the base of the cone, the three axially oriented faces forming abutments through which torque is applied to the fastener by the driver.

A further object of this invention is to provide driving tools for fasteners of the character referred to above.

The invention resides in certain designs, constructions and arrangements of parts and further objects and advantages will be apparent to those skilled in the art to which the invention relates from the following description of the preferred embodiments described with reference to the accompanying drawings forming a part of this specification and in which.

Figure 1:
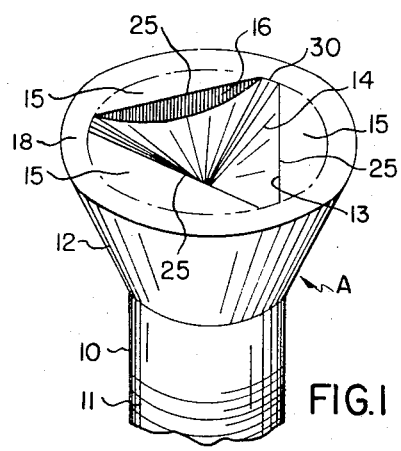
FIG. 1 is a perspective view of the head or driving end of a fastener embodying the present invention.
Figure 2:
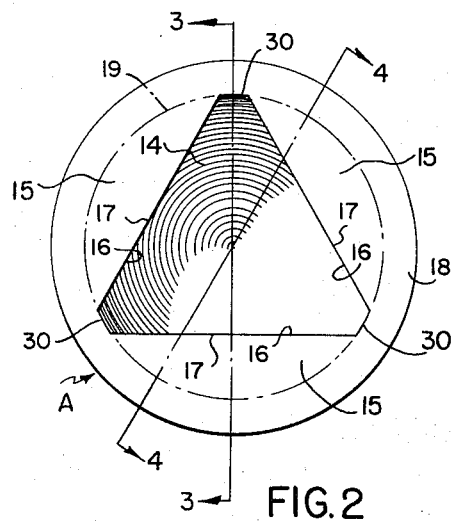
FIG. 2 is a top elevational view of the fastener shown in FIG. 1.
Figure 3:
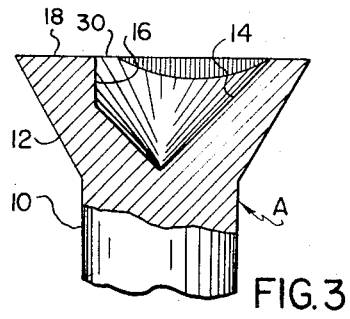
FIG. 3 is a sectional view taken approximately along the lines 3—3 of FIG. 2.
Figure 4:
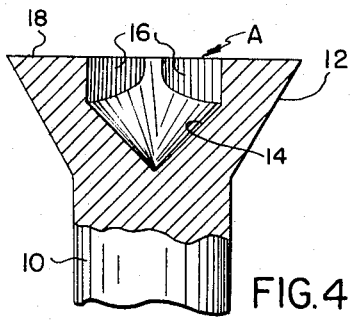
FIG. 4 is a sectional view taken approximately along the lines 4—4 of FIG. 2.

While the invention is susceptible of embodiment in threaded fasteners of various types including headless fasteners and fasteners having various head styles such as machine head, flat head, and the like, it is herein illustrated as embodied in a screw having a countersunk type head provided with a driving recess the design of which is such that the fastener may not be manipulated with a bladed object, such as a knife or a conventional screwdriver. This so-called tamper-proof fastener is particularly desirable for use in applications such as vending machines, parking meters and the like.

Referring to the drawings, the fastener shown comprises a headed screw designated generally by the reference letter A. The fastener A includes a shank 10, only a portion 11 of which is threaded, and a countersunk style head 12 provided with a driving recess 13. The driving recess is defined by a conical surface 14, which in the illustrated embodiment is a right circular conical surface, and three axially oriented walls. In said recess, or more specifically in the head portion adjacent to the recess there are three identical symmetrically oriented segments 15, each having an axially oriented face 16 which form the axially oriented walls of the driving recess. The intersections 17 of the axially oriented faces 16 with the end surface 18 of the fastener are chords of a circle 19 forming the periphery of the base of the cone. The conical surface 14 shown corresponds to the surface of a right circular cone, preferably one generated by the revolution of a right triangle about one of its legs, the acute angles of which triangle are equal. It is to be understood however that other conical recesses may be employed, and perhaps preferred with different head types or styles and countersunk type heads having different head angles.

Figure 5:
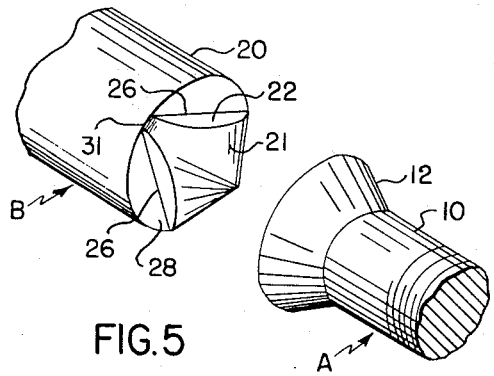
FIG. 5 is a perspective view of the driving end of a driving tool or driver for driving the fastener shown in FIGS. 1 to 4 and embodying the present invention.

As is shown in FIG. 5 the driving tool designated generally by the reference letter B consists of a shank 20, a cone 21, and three symmetrically spaced axially oriented faces 22 the intersections of which with the base of the cone form chords of the circle forming the periphery of the base of the cone. The configuration and size of cone 21 on the shank 20, that is, the driving connection on the end of the shank 20, is the counterpart of the configuration and size of the recess 13 in the fasteners and it is through the three cooperating faces 16 and 22 on the fastener and tool, respectively, that torque is applied by the tool or driver to the fastener.

While in the embodiments shown in the drawings the lines 17 and 26 formed by the intersections of the driving faces 16 and 22 of the fastener and driver with the faces 18 and 28 thereof, respectively, do not intersect as indicated at 30 and 31 respectively, it is to be understood that they could be made to intersect, if desired.

Having thus described my invention, what I claim is:

1. A threaded fastener having a driving recess in the driving end thereof the major surface of which recess is a right circular conical surface with the apex of said surface lying substantially on the axis of the fastener, said recess also having three symmetrically arranged similar planar faces parallel with the axis of said fastener and terminating in the surface of the driving end of the fastener with the intersections of said faces and the surface of the driving end of the fastener being chords of an imaginary circle formed by the intersection of said conical surface if extended and the surface of the driving end of the fastener, said conical surface intersecting the surface of the driving end at least at points on said imaginary circle at the ends of the said chords, said three axially oriented faces forming abutments through which torque may be applied to the fastener by a driver.

References Cited

UNITED STATES PATENTS 3,122,963   3/1964   Borgeson _____ 85—45

FOREIGN PATENTS 747,810   4/1933   France.
753,367   7/1956   Great Britain.

CARL W. TOMLIN, *Primary Examiner.*

R. S. BRITTS, *Assistant Examiner.*